United States Patent Office 2,809,995
Patented Oct. 15, 1957

2,809,995

PRODUCTION OF AMINES

Heinz Noeske, Oberhausen-Sterkrade, and Helmut Kolling, Duisburg-Hamborn, Germany, assignors to Ruhrchemie Aktiengesellschaft, Oberhausen-Holten, Germany, a corporation of Germany No Drawing. Application December 23, 1952,
Serial No. 327,658

Claims priority, application Germany December 31, 1951

6 Claims. (Cl. 260—583)

This invention relates to improvements in the production of amines.

Amines have been produced by mixing an aldehyde with ammonia or a primary or secondary amine and thereafter hydrogenating the mixture in the presence of a suitable hydrogenation catalyst. The mixing of the aldehyde with ammonia or amine was effected, if necessary or desired, in the presence of a solvent. In most cases, the process was carried out in liquid phase with the reaction being effected batch-wise in a pressure vessel.

When effecting the above reaction as was conventional in the liquid phase and at elevated pressures, especially when using low molecular aldehydes, the yield of amines obtained was substantially decreased by the condensation of aldols which occured as a side reaction. This undesirable aldol condensation occurs with particular ease in the alkaline media and is favorably effected by the high pressures present. In addition to high molecular weight amines, resin-like products are also formed thereby.

One object of this invention is the production of amines from aldehydes without the above mentioned difficulties. This and still further objects will become apparent from the following description:

It has now been found that the aldol condensation may be completely repressed and the yield of amines obtained considerably increased if the mixing of the aldehyde to be converted with the ammonia or primary or secondary amine is effected at a temperature below 0° C. The temperature should not be permitted to drop below the freezing point of the reaction mixture. In general, temperatures of between 0° C. and —35° C. are used. The mixture of aldehydes and ammonia or primary or secondary amines is thereafter hydrogenated in the liquid phase at an elevated temperature and pressure in the presence of a suitable hydrogenation catalyst.

The aldehydes converted in accordance with the invention are diluted with low boiling solvents as, for example, with alcohols or hydrocarbons. The solvents should have as low as possible a pour point in order that they will not solidify at the reaction temperature and they should not enter a reaction with the reactants. Particularly suitable as solvents are methanol, ethanol, propanol, butanol, aliphatic hydrocarbons of the molecular size $C_5$–$C_{10}$, low boiling ethers such as ethyl ether, aromatic hydrocarbons of low pour point such as toluene. Without the addition of solvents the process of the invention is not practicable.

The hydrogenation is effected with the use of conventional hydrogenation catalysts as, for example, catalysts containing cobalt or nickel. It has been found of particular advantage to use, for example, Raney nickel as the hydrogenation catalyst. The quantity of the catalyst added should be at least 2%. Without the catalyst the process of the invention cannot be carried out.

In batchwise operation, for example, the process in accordance with the invention may be carried out by charging an autoclave provided with a stirrer with a mixture of one part by weight of an aldehyde and 0.5–4 parts by weight of a solvent such as methanol, at a temperature below 0° C. Though methanol is preferred as the solvent other inert solvents as, for example, hydrocarbons, may also be used. The mixture is maintained at a temperature of 0° C. and gaseous ammonia is passed in until 1–5 moles of ammonia are absorbed per mol of aldehyde. Thereafter, a hydrogenation catalyst is added to the mixture and hydrogen under pressure is passed into the autoclave until a pressure of about 50–200 kilos/sq. cm. is reached, the preferred operating pressure being 80–120 kilos/sq. cm. The hydrogenation temperature is maintained at 80–200° C. and preferably at 100–150° C. The autoclave is heated, while continuously stirring, to the hydrogenation temperature until the hydrogen absorption has ceased. The aliphatic amines are then recovered from the hydrogenated mixture.

The process in accordance with the invention is particularly adapted for the continuous production of aliphatic amines, but also cycloaliphatic aldehydes may be converted. The aldehydes to be converted may contain as much as 12–15 carbon atoms in the molecule. For continuous operation, it is proven practical to use vertical tubes which are filled with stationary hydrogenation catalysts and through which hydrogen or hydrogen-containing gases are passed under pressures of 50–200 kilos/sq. cm. The aldehyde mixture to be converted is either admitted at the base of these reaction tubes and led off at the top of the tubes or trickled from above over the catalyst. The aldehyde which is preferably diluted with a solvent to the extent required is cooled as, for example, in a cooling coil to temperatures below 0° C. The cooled aldehyde is then mixed with the required proportion of ammonia which has similarly been cooled to a temperature below 0° C. The mixing may, for example, be effected in a cooling coil. It may be desirable to further cool the mixture to prevent heating to temperatures above 0° C. The mixture obtained at this low temperature consisting of aldehyde, solvent and ammonia is fed by means of a high pressure pump into the hydrogenation tubes where it reacts in the presence of the catalysts with the hydrogen to form the corresponding amine. It is, of course, also possible to use other suitable devices for the preparation of the precooled reaction mixture.

The process, in accordance with the invention, is particularly well suited for the processing of low boiling aldehydes where the danger of an aldol condensation is particularly great. It is, however, possible to use the process with the same success for the conversion of higher molecular weight aldehydes.

It is possible to convert any type of aliphatic aldehydes in accordance with the invention, including, for example, unsaturated aldehydes, oxyaldehydes and dialdehydes. It is also possible in accordance with the invention to use the aldehydes in mixture with other organic compounds which will not undergo the change during the reaction. Examples of such mixtures include aldehydes and alcohol or hydrocarbons, as, for example, the aldehyde containing products from the oxo synthesis as described, for example, in FIAT Report No. 1000.

As mentioned above, the conversion of aldehydes may be effected with primary or secondary amines in place of ammonia. These amines may contain as much as 12–15 carbon atoms in the molecule. The ratio between aldehydes and amines to be converted is about in the same order of magnitude as the ratio between aldehydes and ammonia. If the primary or secondary amines are used in place of ammonia, the corresponding secondary or tertiary amine compounds will be obtained.

The final products of the process according to the invention consist of primary, secondary or tertiary amines and represent valuable starting materials for many uses such as for organic syntheses.

The following examples are given to further illustrate the invention and not to limit the same:

Example 1

465 parts by weight of propionic aldehyde were mixed with 970 parts by weight of methanol and the mixture was cooled to $-15°$ C. Then 260 parts by weight of ammonia were passed into the cold mixture while further cooling the same, followed by the addition of 30 parts by weight of a nickel catalyst. This nickel catalyst consisted of 57 parts by weight of nickel which was partially present as nickel oxide, 11 parts of magnesium oxide (MgO) and 30 parts of kieselguhr. The mixture consisting of propionic aldehyde, methanol and catalyst was filled into an autoclave with stirrer which had been cooled to $-5°$ C., and exposed to a hydrogen pressure of 70 kilos/sq. cm. Thereafter, the content of the autoclave was heated to $130°$ C. and stirred at a hydrogen pressure of 100 kilos/sq. cm. until the hydrogen absorption was terminated. Then the reaction product was separated from the catalyst. The propylamine formed was separated from the methanol by means of its hydrochloride. A 82% yield of primary propylamine was obtained.

If, deviating from the operation method according to the invention, the ammonia was passed into a non-cooled mixture of propionic aldehyde and methanol and the cooling was effected only so far that the propionic aldehyde did not evaporate, then only a 20% yield of primary propylamine was obtained in the subsequent hydrogenation. The balance consisted of hexylamine and higher condensed products which were partially of a resin-like nature.

Example 2

833 parts by weight of a product from the Oxo synthesis consisting of 62% of $C_7$ aldehyde and 38% of $C_6$ hydrocarbon were mixed with 570 parts by weight of methanol and the mixture was cooled to $-10°$ C. While continuing the cooling, 320 parts by weight of ammonia were passed into the cold mixture followed by the addition of 20 parts by weight of a nickel catalyst. The mixture was filled into an autoclave which had been cooled to $0°$ C., and hydrogenated in the manner described in Example 1. After the hydrogen absorption was terminated, the reaction product was separated from the catalyst by filtration and fractionated after having removed the methanol by distillation. 395 parts by weight of primary $C_7$ amine and 48 parts by weight of diheptylamine were obtained.

Example 3

258 parts by weight of methylethyl acroleine were dissolved in 950 parts by weight of methanol and 235 parts by weight of ammonia were passed into this mixture while cooling to $-15°$ C. After the addition of 30 parts by weight of Raney nickel, the reaction mixture was placed in an autoclave cooled to $-5°$ C., and hydrogenated at a temperature of $130°$ C. in the manner as described in Example 1. After the separation of the catalyst and the removal of the methanol by distillation, 160 parts by weight of 2-methyl-pentylamine could be recovered. In addition, 35 parts by weight of propylamine were obtained which were formed by splitting up of the methylethyl acroleine.

Example 4

500 parts by weight of propionaldehyde were mixed with 800 parts by weight of methanol. While cooling to $-10°$ C., 277 parts by weight of ammonia were passed into this mixture. After the addition of 30 parts by weight of nickel catalyst, the mixture was filled into a cooled autoclave and hydrogenated as described in Example 1. After the separation of the catalyst and the removal of the methanol, 320 parts by weight of hexanolamine and 178 parts by weight of propylamine were obtained.

Example 5

A mixture consisting of 23 parts by weight of propionic aldehyde and 40 parts by weight of methanol was cooled to $-30°$ C. and slowly mixed with 20 parts by weight of propylamine while continuing the cooling. After the addition of 4 parts by weight of nickel catalyst, the mixture was hydrogenated in the manner as described in Example 1. 90% of the propylamine were converted into dipropylamine.

Example 6

A mixture consisting of 1 part by weight of butyric aldehyde and 3 parts by weight of methanol was cooled to $-10°$ C. in a tubular coil of chrome-nickel steel of 10 m. length and an inside diameter of 6 mm., which was externally cooled by means of ammonia. In a second tubular coil of the same construction, gaseous ammonia was cooled to $-10°$ C. In a third tubular coil of the same kind, the butyric aldehyde-methanol mixture was mixed with 0.6 part by weight of the cooled ammonia and the mixture was maintained at $-10°$ C. by external cooling. The butyric aldehyde-methanol-ammonia mixture was introduced by means of a pressure pump to the base of a vertical reaction tube of 5 m. length and 50 mm. inside diameter filled with a stationary nickel catalyst. The reaction was effected at a pressure of 120 kilos/sq. cm. and a temperature of $140°$ C. The butyric aldehyde-methanol-ammonia mixture was admitted from below to the reaction tube and rose in upward direction through the catalyst filling. The reaction products were led off at the top of the tube. The residence time in the reaction tube was 2 hours.

Together with the aldehyde mixture, 0.05 part by weight of hydrogen was hourly fed from below into the catalyst tube and led off at the top of the tube.

The reaction mixture obtained at the top of the tube was converted by means of hydrochloric acid into the corresponding amine hydrochloride. Then the methanol present in the mixture was removed by distillation. Thereupon the hydrochlorides were decomposed by means of alkali solution and the amine mixture was separated by distillation resulting in 92% of primary butylamine and 8% of secondary butylamine.

Example 7

450 parts by weight of tricyclodecanemethylal which had been obtained from dicyclopentadiene by means of the oxo synthesis were mixed with 1200 parts by weight of ethanol. 140 parts by weight of ammonia were passed into the mixture while maintaining a temperature of $-5°$ C. by correspondingly cooling. The mixture thus formed was filled into an autoclave which had been cooled to $0°$ C. At the same time 20 parts by weight of a nickel-containing hydrogenation catalyst were added. Thereafter, the hydrogenation was carried out with hydrogen at an excess pressure of 90 kilos/sq. cm. and a temperature of $120°$ C. After the termination of the hydrogen absorption, the reaction mixture was separated from the catalyst by filtration followed by distilling off all the ethanol. By subsequent fractionation a 83% yield of pure primary tricyclodecanemethylamine was obtained.

Example 8

10 parts by weight of acetaldehyde were dissolved in 100 parts by weight of ethanol and the solution was cooled to $-35°$ C. While continuing the cooling 30 parts by weight of secondary butylamine which had previously been dissolved in 50 cc. ethanol were dropped into the ethanol-acetaldehyde solution. Thereafter, 4 parts by weight of a nickel-containing hydrogenation catalyst were added to the mixture and the mixture was filled into a pressure vessel which had been cooled to −15° C. Then hydrogen under an excess pressure of 100 kilos/sq. cm. was passed into the pressure vessel and the pressure vessel was heated to 130° C. After having removed the catalyst by filtration, the reaction mixture was fractionated resulting in 26 parts by weight of ethyldibutylamine.

We claim:

1. In the process for the production of monoamines by the hydrogenation of an aliphatic hydrocarbon aldehyde with ammonia, the improvement which comprises contacting an aliphatic hydrocarbon aldehyde with ammonia at a temperature below 0° C. in the presence of a low-boiling solvent, hydrogenating the mixture obtained in the liquid phase at temperatures of 80–200° C. and pressures of 50–200 kilos per square meter in the presence of a catalyst selected from the group consisting of cobalt and nickel hydrogenating catalysts and recovering the amine.

2. Improvement according to claim 1, in which said solvent is methanol.

3. Improvement according to claim 1, in which said aliphatic hydrocarbon aldehyde has less than 15 carbon atoms in its molecule.

4. Improvement according to claim 1, in which said aliphatic hydrocarbon aldehyde is present in a mixture obtained by catalytically treating unsaturated hydrocarbons having olefinic double bonds with water gas.

5. Improvement according to claim 1, in which said aliphatic hydrocarbon aldehyde is present in a mixture obtained from catalytically treating unsaturated hydrocarbons with water gas, said mixture also containing some saturated hydrocarbons and alcohol.

6. Improvement according to claim 1, in which said hydrogenation is effected by substantially passing the mixture obtained from the contacting of said aliphatic hydrocarbon aldehyde and ammonia in contact with hydrogen through a vertical path of flow containing a stationary hydrogenation catalyst at elevated temperature and pressure.

References Cited in the file of this patent

UNITED STATES PATENTS

| | | |
|---|---|---|
| 2,217,630 | Winans | Oct. 8, 1940 |
| 2,219,879 | Vanderbilt | Oct. 29, 1940 |
| 2,298,284 | Emerson | Oct. 13, 1942 |
| 2,317,757 | Graf | Apr. 27, 1943 |
| 2,408,171 | Johnson | Sept. 24, 1946 |
| 2,408,172 | Johnson | Sept. 24, 1946 |
| 2,540,938 | Finch | Feb. 6, 1951 |
| 2,618,658 | Caldwell | Nov. 18, 1952 |
| 2,652,430 | Finch et al. | Sept. 13, 1953 |

OTHER REFERENCES

Schwoegler et al.: J. Am. Chem. Soc. 61, 3500, 1939.
Sprung: Chemical Reviews 26, page 304 (1940).
Rohrman et al.: J. Am. Chem. Soc. 66, p. 1519 (1944).
Emerson: "Organic Reactions," Adams, John Wiley & Sons, New York, 1948, vol. IV, pp. 175–176.